United States Patent [19]

Takahashi

[11] Patent Number: 4,722,415
[45] Date of Patent: Feb. 2, 1988

[54] SADDLE RIDING TYPE VEHICLE FOR RUNNING ON ROUGH LANDS

[75] Inventor: Hirotake Takahashi, Saitama, Japan

[73] Assignee: Honda Giken Kogyo Kabushiki Kaisha, Tokyo, Japan

[21] Appl. No.: 865,533

[22] Filed: May 21, 1986

[30] Foreign Application Priority Data

May 24, 1985 [JP] Japan .................................. 60-111500

[51] Int. Cl.$^4$ .............................................. B62D 7/16
[52] U.S. Cl. ..................................... 180/257; 180/244; 277/212 FB
[58] Field of Search ...................... 180/54.1, 253, 256, 180/257, 244; 280/691, 696; 277/212 FB

[56] References Cited

U.S. PATENT DOCUMENTS

| | | | |
|---|---|---|---|
| 2,649,922 | 8/1953 | Hutchinson et al. | 180/253 |
| 3,476,200 | 11/1969 | Schoepe et al. | 180/256 X |
| 3,759,340 | 9/1973 | Schilter | 180/257 X |
| 4,223,902 | 9/1980 | Fry | 280/691 X |

FOREIGN PATENT DOCUMENTS 227523 12/1984 Japan .

Primary Examiner—David M. Mitchell
Assistant Examiner—Michael Mar
Attorney, Agent, or Firm—Lyon & Lyon

[57] ABSTRACT

In a saddle riding type vehicle suitable for running on rough lands, a pair of left and right frontwheels supported frontwardly of a body frame through a swing arm and a front axle housing have relatively wide wheel rims, within which rims knuckles and joints for transmitting a power for driving the front wheels are arranged, and a brake mechanism is provided outwardly of the knuckle and joint.

8 Claims, 5 Drawing Figures

SADDLE RIDING TYPE VEHICLE FOR RUNNING ON ROUGH LANDS

BACKGROUND OF THE INVENTION

1. Field of the Invention

The present invention relates to a vehicle of the saddle riding type for operating on a rough terrain. Particularly the invention involves a vehicle of the described type in which knuckle holders provided on both ends of a front axle housing that is vertically swingable on a body frame at the front thereof are pin-connected to knuckles mounting the front wheels, and a driving shaft extending laterally from a differential gear arranged in an intermediate portion of the front axle housing connects to the front wheels through joints enclosed within said knuckle holders and knuckles.

2. Description of the Prior Art

In the past, in vehicles for running on rough terrain in which the two front wheels are driven, a brake mechanism is disposed in an intermediate portion of a front axle housing, as disclosed in Japanese Patent Application Laid-Open No. 227,523/1984. Thus, the front axle housing of the vehicle often comes in contact with rocks or the like. In order to avoid this contact, it is desired to raise the effective minimum level of the front axle housing from the ground as high as possible. It is further desired to protect the aforesaid knuckles, knuckle pins and the like from contact with obstacles in order to minimize damage thereto.

SUMMARY OF THE INVENTION

In view of the foregoing, and it is an object of the invention to provide a vehicle for running on rough terrain in which the effective minimum level of a front axle housing from the ground is raised as high as possible to effectively prevent damages to the parts.

For achieving the aforementioned object, according to the present invention, wheel rims of both front wheels have their width formed to be relatively large, a brake mechanism is supported on a knuckle and is disposed axially outwardly within the wheel rim, and knuckle holders are connected to the knuckles in such a manner that knuckle pins and joints are arranged within the wheel rims.

With the arrangement as described above, the brake mechanism is also disposed within the wheel rim so that the minimum level of the front axle housing from the ground may be raised as high as possible, and parts such as knuckle pins, are effectively prevented from contact with outside obstacles due to protection afforded by the wheel rims.

Furthermore, the brake mechanism can be cooled efficiently since it is disposed axially outwardly within the wheel rim.

The above and other objects, features and advantages of the present invention will be apparent from the description of preferred embodiments which will be described in detail in connection with the accompanying drawings.

DESCRIPTION OF THE PREFERRED EMBODIMENTS

Figure 1:
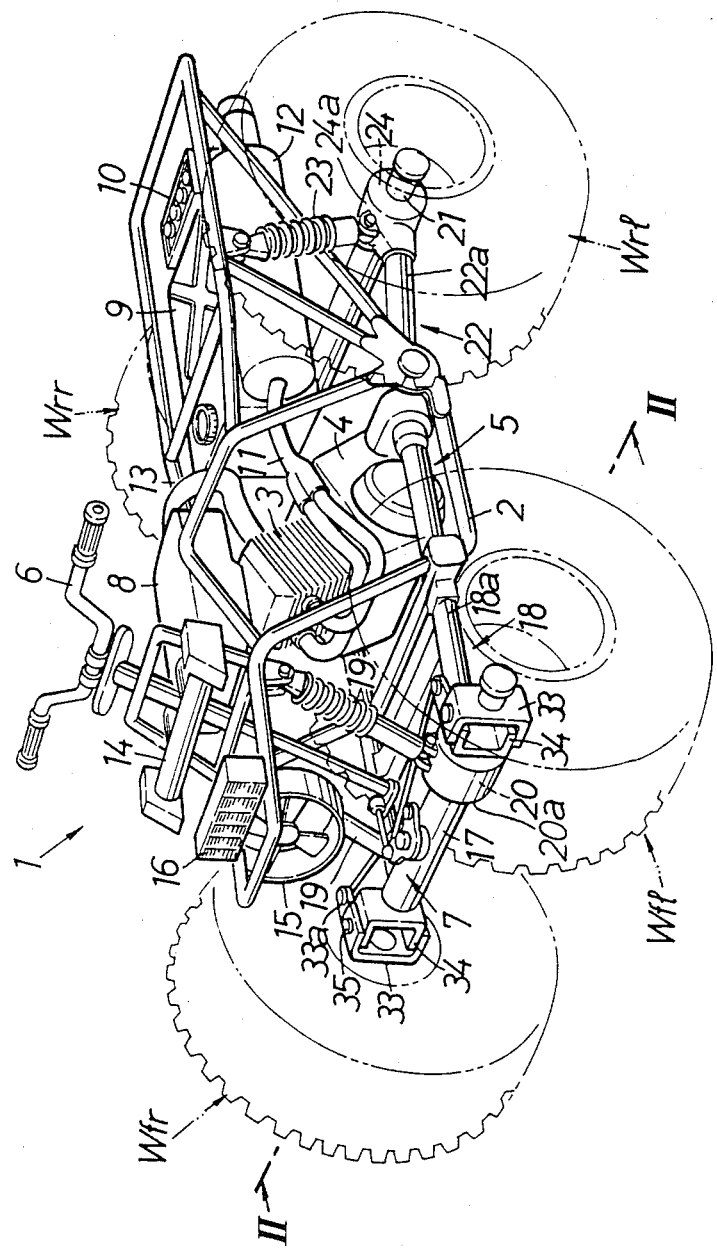
FIG. 1 is a perspective view of a vehicle according to the present invention.

One embodiment of the present invention will be described hereinafter with reference to FIGS. 1 to 4. First, referring to FIG. 1, a four-wheel vehicle 1 of the saddle riding type for operations on rough terrain is shown in the form of an all-wheel drive type, and is designed so that an occupant may straddle the seat (not shown) disposed above a body frame 2 with his feet resting on steps (not shown) on opposite sides of the frame. A power unit 5 composed of an engine 3 and a transmission 4 is installed generally centrally of the body frame 2. A pair of left and right front wheels Wfl, Wfr are suspended forwardly of the body frame 2 whereas a pair of left and right rear wheels Wrl, Wrr are suspended rearwardly therof.

A rod-like steering handle 6 is pivotally supported in a forward portion of the body frame 2, and a steering link mechanism 7 operated by the actuation of the steering handle 6 is arranged to steer both front wheels Wfl and Wfr.

An air cleaner 8 is disposed in the central upper portion of the body frame 2, and a fuel tank 9 and battery 10 are installed on an upper, rear part of the body frame 2. An exhaust pipe 11 of the engine 3 extends rearwardy of the frame, and a muffler 12 provided intermediate ends of the exhaust pipe 11 is supported on the upper, rear part of the body frame 2. Further, an air cleaner 8 for the engine 3 is connected thereto through an intake pipe 13. Air is supplied to the air cleaner 8 by means of an intake duct 14 opening at the front portion of the body frame 2 with its opening directed rearwardly. A cooling fan 15 and an oil cooler 16 are supported on the front portion of the body frame 2.

A front swing frame 18 having a horizontal front axle housing 17 at forward a end thereof is vertically swingably mounted on the front portion of the body frame 2, and a pair of front cushions 19 are interposed between the front axle housing 17 and the body frame 2.

A casing 20a for accommodating a differential gear 20 is provided in an intermediate portion of the front axle housing 17 close to the left front-wheel Wfl. A driving force from the power unit 5 is transmitted to the differential gear 20 through a propeller shaft (not shown) arranged within a hollow longitudinal frame 18a constituting part of the front swing frame 18.

A rear swing frame 22 having a rear axle housing at the rear end thereof is vertically swingably mounted on the rear of the body frame 2, and a pair of rear cushions 23 are interposed between the rear axle housing 21 and the body frame 2.

A casing 24a for accommodating a reduction gear 24 is provided in an intermediate portion of the rear axle housing 21 close to the left rear-wheel Wrl, and a driving force from the power unit 5 is transmitted to the reduction gear 24 through a propeller shaft (not shown) arranged within a hollow longitudinal frame 22a constituting the rear swing frame 22 and then distributed to both rear wheels Wre and Wrr.

Figure 2:
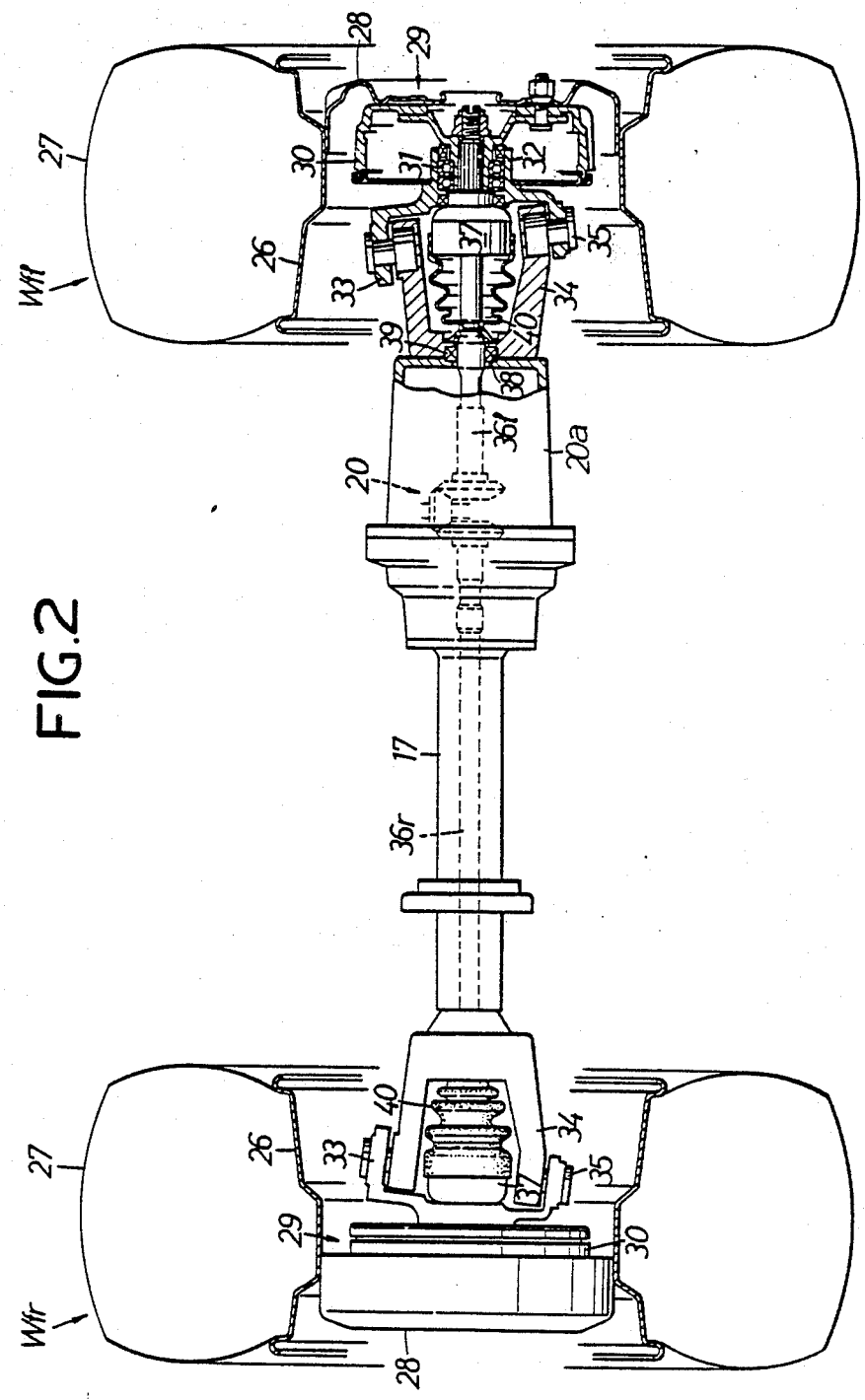
FIG. 2 is an enlarged sectional view taken on line II—II of FIG. 1.

As shown in FIG. 2, wheel rims 26 of both the front wheels Wfl, Wfr have their axial width formed to be relatively large, and a balloon tire 27 having an extremely low internal pressure is mounted on each wheel rim 26. A wheel disk 28 is secured to the inner surface of the wheel rim 26 at a position axially outside of the rim, and a drum 30 of a drum brake 29 is secured to the inner surface of the wheel disk 28. Thus, the drum brake 29 is to be arranged at an axially outward position within the wheel rim 26.

The brake drum 30 attached to the wheel disk 28 is rotatably carried on a hub 32 through a bearing 31. This hub 32 forms an integral part of a knuckle 33 having a cross section of approximate U shape. A knuckle holder 34 approximately of a U shape in cross section, is secured so as to oppose to the knuckle 33 at the end of the front axle housing 17. The knuckle holder 34 and the knuckle 33 are connected with each other through a pair of upper and lower knuckle pins 35. The knuckle 33 is integrally provided with a knuckle arm 33a (see FIG. 1), the knuckle arm 33a being connected to the steering link mechanism 7 (see FIG. 1) provided above the front axle housing 17. Thus, both the front wheels Wfl and Wfr are steered according to the operation of the steering handle 6.

Driving shafts 36r and 36, extending both leftward and rightward within the front axle housing 17, are caused to operably engage the differential gear 20. The driving shafts 36l, 36r at their axially outer ends extend through the knuckle holders 34 and are connected to the front wheels Wfl and Wfr, respectively, through constant velocity joints 37.

The knuckle holders 34 are secured to opposite ends of the front axle housing 17 so as to close its end openings. In the illustrated embodiment, the knuckle holder 34 on the side of the left front wheel Wfl is directly secured to one side of the casing 20a of the differential gear 20. Each driving shaft 36l, 36r extends through a bore 38 formed in the central portion of the knuckle holder 34 with a seal member 39 interposed between the shaft and the inner surface of the bore 38.

The constant velocity joint 37 at one end is spline-coupled to the brake drum 30 and arranged within the knuckle 33 and knuckle holder 34, and at the other end is spline-coupled to the end of the driving shaft 36l (36r) projecting from the bore 38 in the knuckle holder 34. This constant velocity joint 37 is covered with a boot 40.

The knuckle 33 and knuckle holder 34 are arranged such that their major portions are enclosed within the wheel rim 26. More specifically, the knuckle pin 35 is arranged so as to provide a coupling between the knuckle 33 and knuckle holder 34 at a position as close as possible to the axially central portion of the wheel rim 26.

Figure 3:
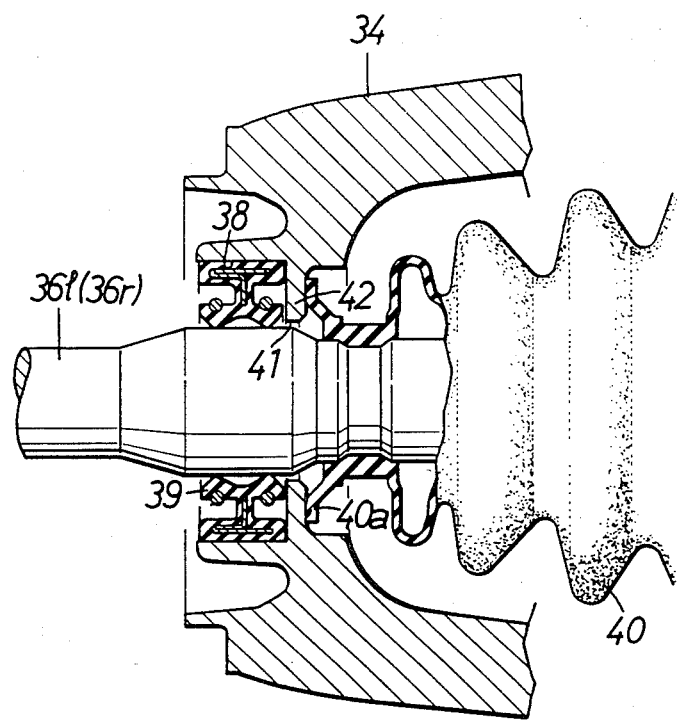
FIG. 3 is a sectional view in enlarged scale illustrating essential parts of the vehicle of FIG. 1.

In FIG. 3, a regulating projection 42 projects annularly from the inner surface of the bore 38 in the knuckle holder 34 toward the outer surface of the driving shaft 36l (36r) to leave a small annular clearance 41 between the shaft and the knuckle holder bore on the side of the joint 37 toward the seal member 39. A flange portion 40a at the inner end of the boot 40 encircles the driving shaft 36l (36r) and is disposed in resilient contact with the regulating projection 42. The flange portion 40a extends over the whole circumference of that end of the boot 40 covering the joint 37 near the knuckle holder 34.

Figure 4:
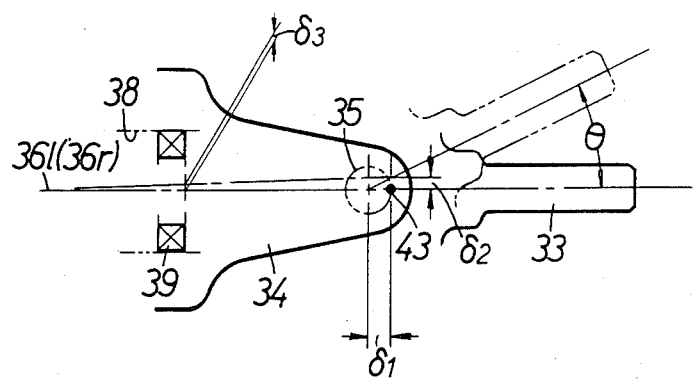
FIG. 4 is a schematic view illustrating the operational relationship between a knuckle pin and a rotational center of a constant velocity joint according to the invention.

As shown in FIG. 4, assuming that the position of the knuckle pin 35 is displaced from the rotational center 43 of the joint 37 by an amount, $\delta1$, in the axial direction of the driving shaft 36l (36r) when the front wheels Wfl, Wfr are turned by angle $\theta$, the rotational center 43 is displaced by an amount, $\delta2$ in the travelling direction of the vehicle 1 due to the displacement as described. Thus, the driving shaft 36l (36r) is displaced by an amount, $\delta3$, in said travelling direction within the bore 38 of the knuckle holder 34, and a lateral loading proportional to that amount of displacement of the shaft is imposed upon the seal member 39.

However, the regulating projection 42 projects from the inner surface of the bore 38, and, consequently, limits the amount of displacement $\delta3$ of the driving shaft 36l (36r) to an extremely slight extent by means of the shaft abutting against the projection 42. Thus, any excessive lateral load is prevented from acting on the seal member 39 thereby to assure good sealing performance. Notwithstanding the fact that the constant velocity joint 37 is designed to allow a minor play during operation, because the displacement amount $\delta3$ of the driving shaft 36l (36r) is limited by the regulating projection 42, it is possible to prevent an excessive load from acting on the driving shaft 36l (36r).

In assembly, the driving shaft 36l (36r) is inserted into the front axle housing 17 from the outside through the opening 38 in the knuckle holder 34 and is connected to the differential gear 20. To effect the connection with the differential gear 20, the driving shaft 36l (36r) is provided at its axially inner end with a spline (not shown). During the assembly process the spline could possibly damage the seal member 39; however, according to the invention, since the regulating projection 42 is provided on the inner surface of the bore 38 at a position outside the seal member 39, the driving shaft 36l (36r) is guided by the regulating projection 42 at the time of insertion, and therefore, any damage to the seal member 39 due to the presence of the spline, if any, can be minimized. Moreover, since the seal member 39 is designed to have a relatively large interference so as to cope with the sideway displacement of the driving shaft 36l (36r), damage prevention by the regulating projection 42 is particularly effective.

Furthermore, in cases where the vehicle 1 is operated on rough roads the regulating projection 42 can also function to protect the seal member 39 from contact with stones and mud. In addition, since the flange portion 40a of the boot 40 is placed into resilient abutment with the regulating projection 42, the entry of mud water or the like into the seal member 39 is positively prevented.

Next, the operation of this embodiment will be described. When the vehicle 1 runs in rough terrain rocks and the like often hit the vehicle but the connection between the knuckle 33 and the knuckle holder 34, that is, the knuckle pin 35 is arranged within the wheel rim 26, and therefore, collision and contact of rocks, trees and the like with the aforesaid connection which is relatively weak in terms of strength, can be suppressed to a minimum. Also such contact with the joint 37 can similarly be suppressed to a minimum.

Furthermore, because the drum brake 29 is arranged at an axially outward position within the wheel rim 26, cooling of its component parts by natural wind or air produced during running is carried out efficiently.

Moreover, since the brake mechanism is not provided within the lateral extent of the front axle housing 17, the effective minimum level of the front axle housing 17 from the ground can be raised.

Figure 5:
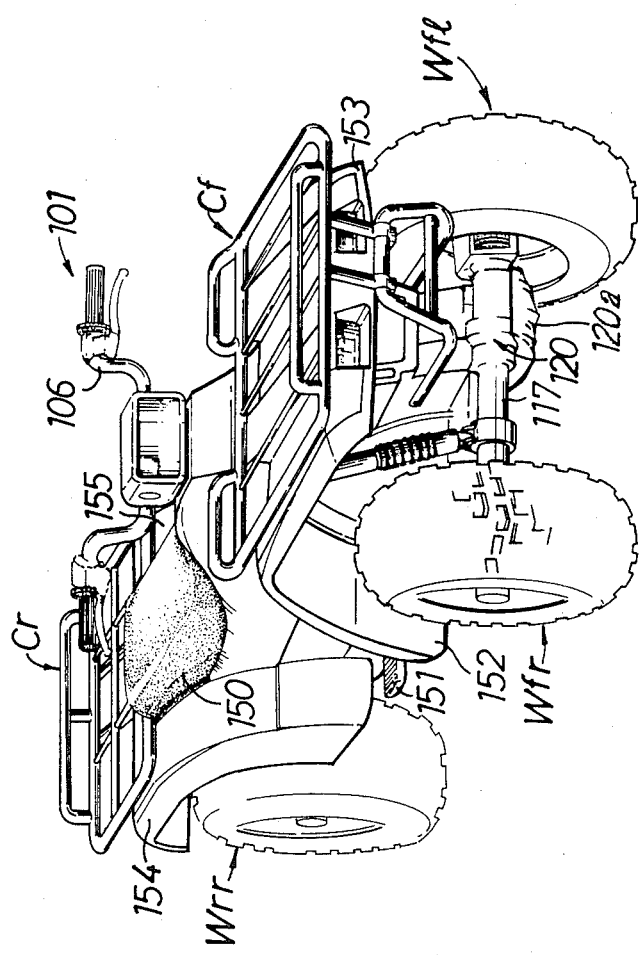
FIG. 5 is a perspective view of a of a vehicle employing the present invention but having an external configuration different from that of the vehicle shown in FIGS. 1 to 4.

FIG. 5 shows the entire view of a four-wheel vehicle 101 having a configuration different from that of the vehicle shown in FIGS. 1 to 4. In the vehicle of FIG. 5, connecting structures between a front axle housing 117 and left and right front-wheels Wfl, Wfr are similar to those of the abovedescribed embodiment. A front carrier Cf and a rear carrier Cr are provided above covers 152, 153 for the front wheels and above covers 154, 155 for the rear wheels, respectively. Reference numeral 150 designates a seat, and 151 designates a step.

What is claimed is:

1. A saddle riding vehicle for operation on rough terrain comprising:

a body frame having a seat on the upper part thereof, an engine mounted on said body frame beneath said seat generally centrally of said vehicle, pairs of oppositely spaced front and rear wheels, each including a wheel rim mounting a pneumatic tire, oppositely extending front and rear swing arm structures attaching the respective of said wheel pairs for vertical pivotal movement with respect to said body frame, said front swing arm structure including a hollow axle housing having a differential housing adjacent one axial end thereof, knuckle holders having an axial opening secured to opposite ends of said hollow axle housing, knuckles, pin-connected to said knuckle holders, rotably mounting said front wheel rims, a differential gear in said differential gear housing, oppositely extending drive shafts in said axle housing extending spacedly through said knuckle holder openings and said knuckles to drivingly connect said differential gear to said front wheel rims, a resilient boot located within each said knuckle holder and surrounding the end portion of the drive shaft located therein, said boot including a resilient flange at the inner end thereof, resilient annular seal means surrounding each said drive shaft and sealing the space between said drive and the adjacent knuckle holder opening, and means forming an annular projection extending inwardly about said knuckle holder opening between and in abutting relation to said seal means and said boot flange.

2. The vehicle according to claim 1 further comprising a steering mechanism disposed above said axle housing operatively connecting said knuckles.

3. The vehicle according to claim 1 wherein one of said knuckle holders is directly attached to said differential gear housing.

4. The vehicle according to claim 1 including joint means enclosed by said knuckle holders and knuckles interposed between said drive shafts and said wheel rims.

5. The vehicle according to claim 1 in which wheel rims enclose said knuckle holders and said knuckles.

6. The vehicle according to claim 5 including a brake mechanism supported on each of said knuckles in an axially outward position within said wheel rims.

7. The vehicle according to claim 1 wherein said front swing arm structure includes a pair of oppositely spaced swing arms connected at one end to said body frame by a pivot connection and at the other end to said axle housing, one of said swing arms having a hollow interior, and a drive shaft coupling said differential gear to said engine extending through said swing arm interior.

8. The vehicle according to claim 1 including a cushion operatively connected between said front swing arm and said body frame, said cushion connecting with said swing arm at said differential housing.

* * * * *

UNITED STATES PATENT AND TRADEMARK OFFICE
CERTIFICATE OF CORRECTION

PATENT NO. : 4,722,415

DATED : February 2, 1988

INVENTOR(S) : Hirotake Takahashi

It is certified that error appears in the above—identified patent and that said Letters Patent is hereby corrected as shown below:

On line 38, column 5 through line 10, column 6, replace

"... a resilient boot located within each said knuckle holder and surrounding the end portion of the drive shaft located therein, said boot including a resilient flange at the inner end thereof, resilient annular seal means surrounding each said drive shaft and sealing the space between said drive and the adjacent knuckle holder opening, and means forming an annular projection extending inwardly about said knuckle holder opening between and in abutting relation to said seal means and said boot flange."

with

-- a resilient boot located within each said knuckle holder and surrounding the end portion of the drive shaft located therein, said boot including a resilient flange at the inner end thereof, resilient annular seal means surrounding each said drive shaft and sealing the space between said drive and the adjacent knuckle holder opening, and means forming an annular projection extending inwardly about said knuckle holder opening between and in abutting relation

UNITED STATES PATENT AND TRADEMARK OFFICE
CERTIFICATE OF CORRECTION

PATENT NO. : 4,722,415
DATED      : February 2, 1988
INVENTOR(S): Hirotake Takahashi It is certified that error appears in the above-identified patent and that said Letters Patent is hereby corrected as shown below:

to said seal means and said boot flange.--

Signed and Sealed this

Twenty-second Day of November, 1988

Attest:

DONALD J. QUIGG

*Attesting Officer*              *Commissioner of Patents and Trademarks*